March 13, 1973  A. SUVANTO ET AL  3,720,436
MANIPULATING TOOL FOR A NUCLEAR REACTOR COMPONENT
PROVIDED WITH A HANDLE
Filed April 20, 1970  10 Sheets-Sheet 2
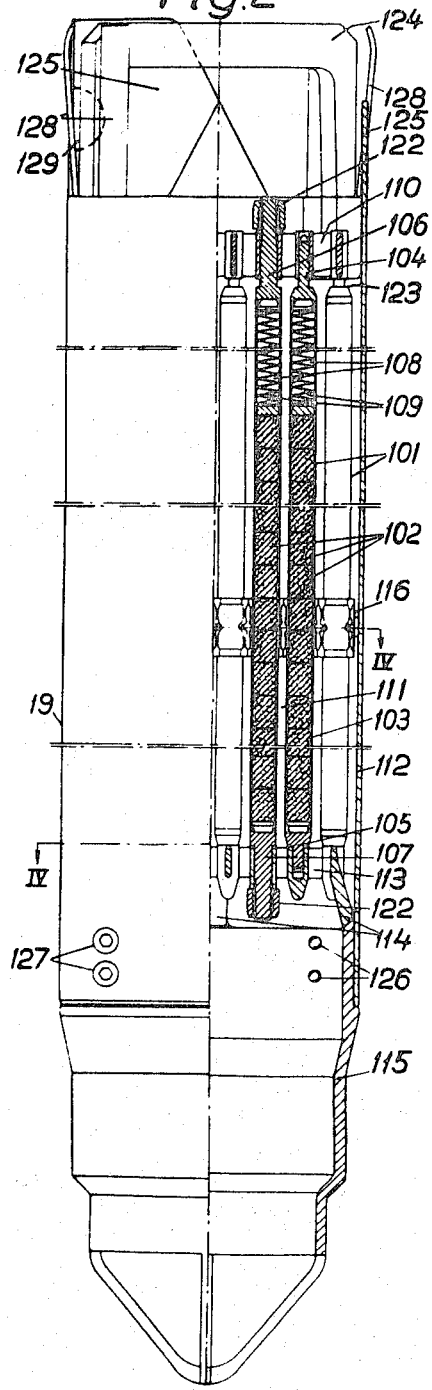
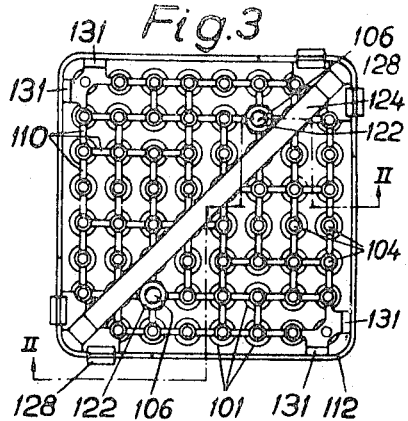
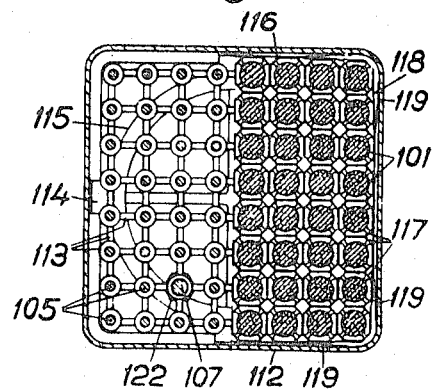
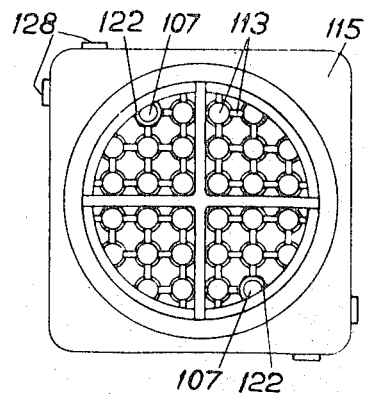
INVENTOR.
ANTTI SUVANTO
BY HILDING NILSSON

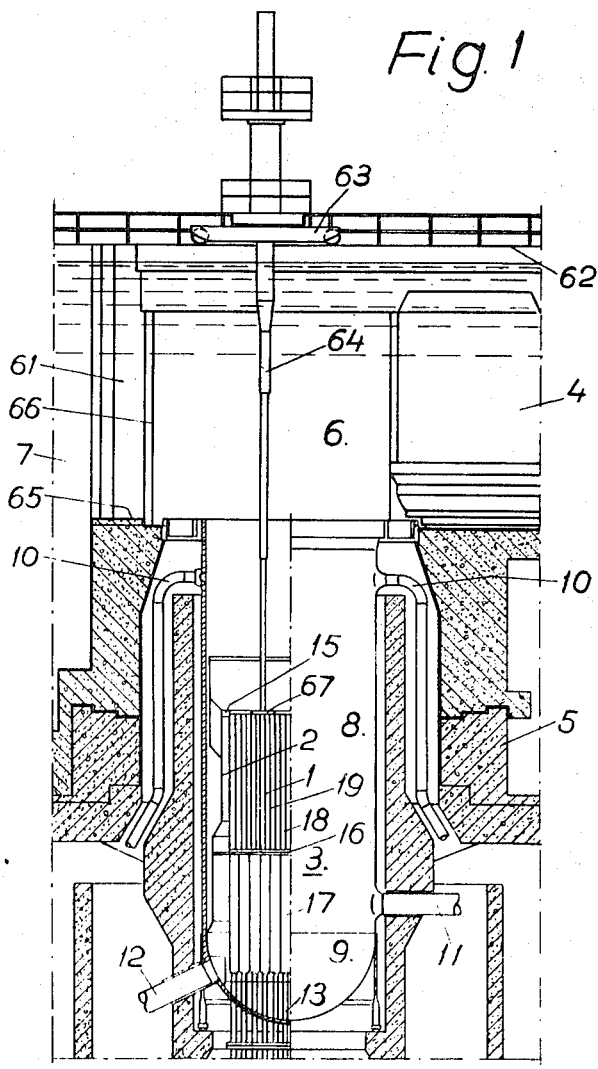

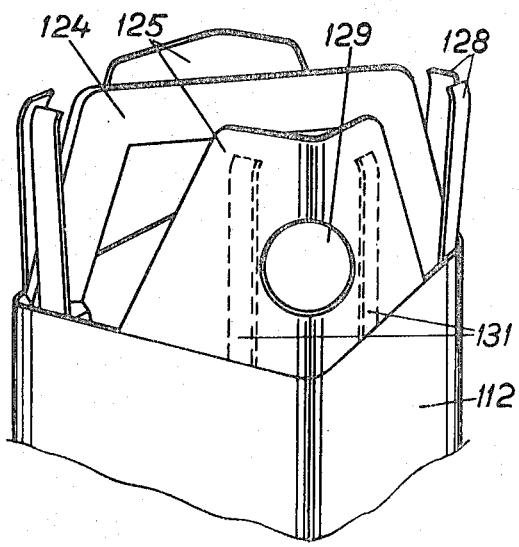
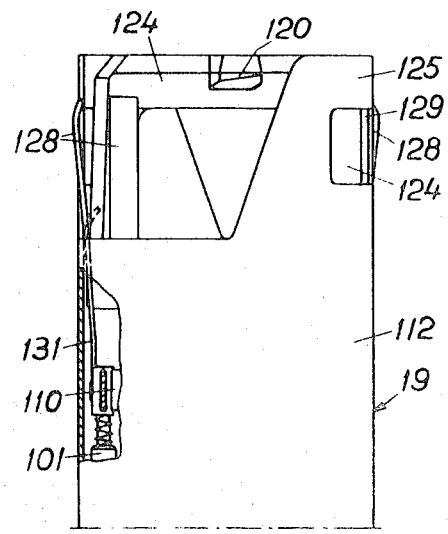
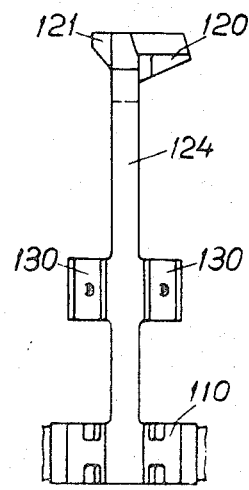

INVENTOR
ANTTI SUVANTO
BY HILDING NILSSON

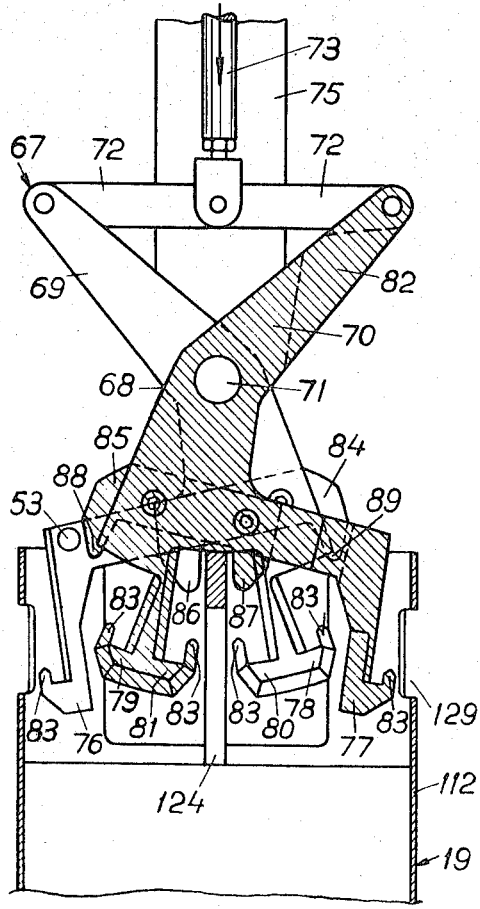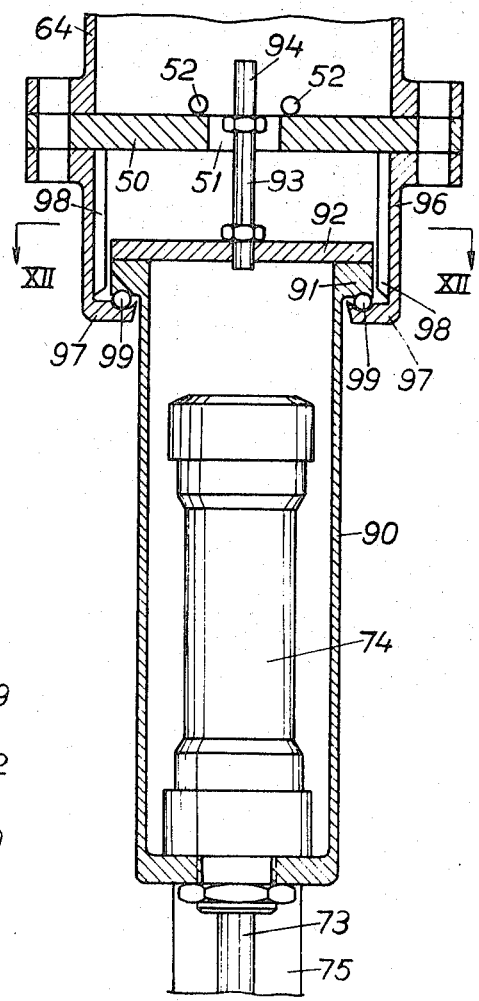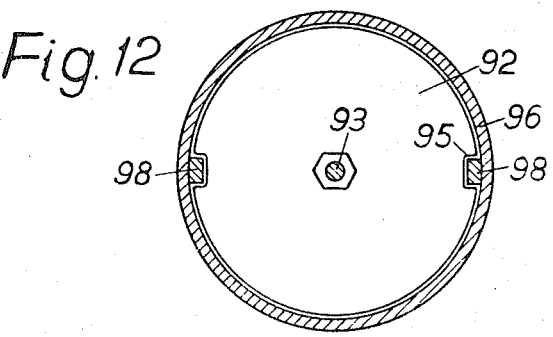

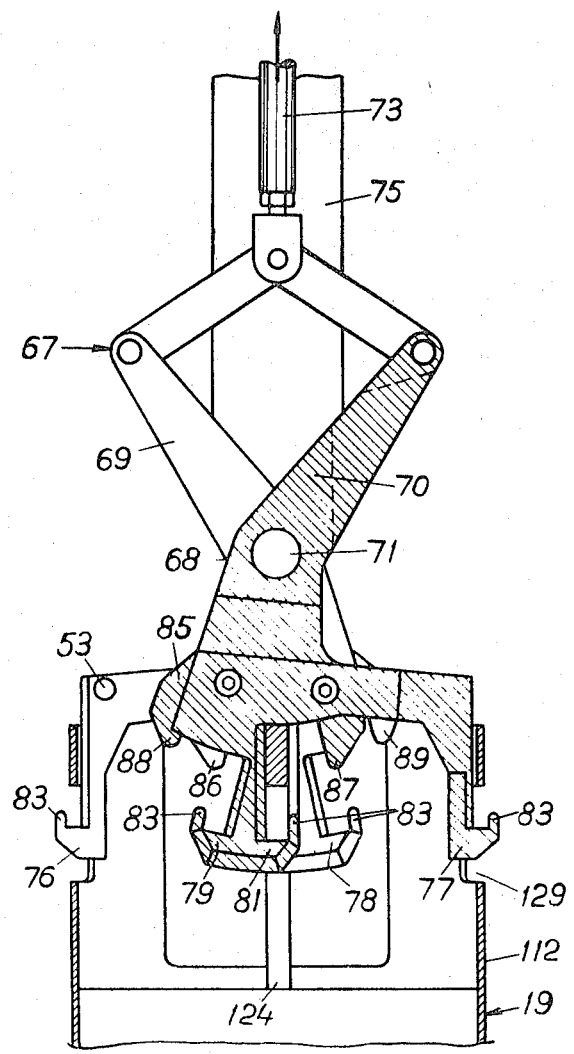

United States Patent Office 3,720,436
Patented Mar. 13, 1973

3,720,436
MANIPULATING TOOL FOR A NUCLEAR REACTOR COMPONENT PROVIDED WITH A HANDLE
Antti Suvanto and Hilding Nilsson, Vasteras, Sweden, assignors to Aktiebolaget Asea-Atom, Vasteras, Sweden
Filed Apr. 20, 1970, Ser. No. 30,196
Claims priority, application Sweden, Apr. 21, 1969, 5,576/69
Int. Cl. B66c 1/28
U.S. Cl. 294—88                    3 Claims

ABSTRACT OF THE DISCLOSURE

A manipulating tool for a nuclear reactor component, such as a shroud tube having holes in its upper end, a fuel rod bundle or a control rod provided at its upper end with a handle, or a complete fuel assembly having said bundle in said shroud tube. The tool is formed of two crossing legs pivoted together and connected at their upper end to an operating member. The legs have first and second hooks for simultaneous engagement in the holes and in the handle respectively, and oppositely directed third hooks for engaging in the handle only.

BACKGROUND OF THE INVENTION

(1) Field of the invention

The present invention relates to a manipulating tool both for a nuclear fuel assembly of the type having a fuel rod bundle provided with a handle and arranged as a freely removable loose insert in a shroud tube provided at its upper end with at least one lifting hole on each side of the handle and also for other nuclear reactor components provided with handles, said manipulating tool comprising a scissor-like gripping member which at the upper ends of the legs is connected to an operating device.

The application of Suvanto et al., Ser. No. 793,812, filed Jan. 24, 1969 describes a fuel assembly in which the fuel rod bundle may be provided with a handle and is arranged as a freely removable loose insert in a shroud tube. The shroud tube is provided at its upper end with connecting means, for example lifting holes, for a gripping member in a lifting device. The lifting holes are so arranged in the wall of the shroud tube that at least one lifting hole is located on each side of the handle and on a level with it. With fuel assemblies of this type the shroud tube can be re-used and the fuel rod bundle can be freely drawn out of the shroud tube and replaced by a new bundle without any screws or similar attachment means have to be loosened first.

RELATED APPLICATIONS

The application of Antti Suvanto and Ake Fries, for Blocking Arrangement for Mechanism for Handling Fuel Assemblies in Nuclear Reactors, Ser. No. 30,096, filed Apr. 20, 1970, corresponding to Swedish application No. 5,575/69, filed Apr. 21, 1969, corresponds in general to the disclosure herein but claims a blocking arrangement for ensuring proper orientation of the fuel assembly which is the invention of the said Suvanto and Fries.

SUMMARY OF THE INVENTION

The object of the present invention is to provide a manipulating tool by which the above-mentioned complete fuel assembly or only its shroud tube, its fuel rod bundle or some other component in the reactor provided with a handle—for example a control rod—can be manipulated.

The manipulating tool according to the invention, which comprises a scissor-like gripping member which is connected at the upper ends of the legs to an operating device, is characterized in that at their lower part the legs are provided with outwardly projecting first hook means for gripping from the inside outwardly in the lifting holes, and also with oppositely directed second hook means for gripping from the outside inwardly in the handle only. In such a manipulating tool the legs in a folded-in end position can be inserted into the upper part of the shroud tube and folded out to engage in the lift holes and can be lowered in a folded-out end position to a handle, for example on a fuel rod bundle or a control rod, and folded in to engage in the handle.

Preferably the lower part of the legs is shaped to engage simultaneously with the first hook means from the inside outwardly in the lifting holes and with third hook means for gripping from the outside inwardly against the handle. Therefore, even if the fuel assembly has become so firmly lodged in its position that the lifting holes or the shroud tube itself are torn apart, it is still possible to lift the fuel rod bundle out of the core.

It is suitable for each hook means to be provided with a blocking claw which prevents the gripping member from dropping a load during transport. The claws also prevent incorrect operation of the gripping member, that is, releasing the grip before the load has been positioned and the gripping member has been lowered further so that the blocking claws are free.

It is also suitable for the legs to be provided with guide shoulders which, when the gripping member releases its grip in the handle, guide the gripping member in relation to the handle in such a way that the blocking claws pass upwardly past the handle when the gripping member is raised. It is thus impossible for the claws to catch in the handle when the gripping member is lifted again after releasing a load and by mistake lift the load again.

The gripping member with its operating device is connected to a lifting device and is preferably substantially secured against rotation by means of an anti-rotation guide with a certain clearance but has a certain limited freedom of rotary movement in relation to the lifting device. In this way the gripping member has such freedom of movement that guide springs arranged on the fuel assembly can rotate the assembly to the correct position upon insertion into the reactor. In order to facilitate the rotary movement it is suitable for an axial bearing to be located in the connection between the gripping member and the lifting device.

The anti-rotation guide is advantageously designed to permit a certain axial movement between the gripping member and the lifting device and a certain skewing between the gripping member and the lifting device. The demand for exactitude in the movement of the lifting device is thus reduced. It is also suitable to arrange a monitoring means for interrupting the manipulating process if the skewing is too great and also if there is too much axial movement between the gripping member and the lifting device.

BRIEF DESCRIPTION OF THE DRAWINGS

Particularly preferred embodiments and what is achieved by them will be clear from the following description and drawings.

In the drawings:

FIG. 1 shows partly in vertical section a refueling operation in a boiling light-water reactor.

FIG. 2 shows a fuel assembly with supporting and reusable sheathing tube, partly in longitudinal section along the line II—II in FIG. 3.

FIG. 3 shows an upper end view of the fuel assembly in FIG. 2.

FIG. 4 shows a cross section of the fuel assembly along the line IV—IV in FIG. 2.

FIG. 5 shows a lower end view of the fuel assembly in FIG. 2.

FIG. 6 shows in perspective the upper part of the fuel assembly in FIG. 2.

FIG. 7 shows in side view an alternative embodiment of the upper part of the fuel assembly.

FIG. 8 shows in side view of the handle of the fuel rod bundle in the fuel assembly according to FIG. 7.

FIG. 11a shows partly in side view the gripping member of the manipulating tool with the lower legs in folded-in end position inserted in the upper part of a fuel assembly.

FIG. 11b shows partly in vertical section the operating device for the gripping member.

FIG. 12 shows the device of FIG. 11b in section along the line XII—XII of FIG. 11b.

FIG. 13 shows the gripping member when manipulating a complete fuel assembly.

FIG. 17 shows the device of FIG. 11a in section along the line XVII—XVII of FIG. 11a.

DESCRIPTION OF THE PREFERRED EMBODIMENTS

Figure 9:
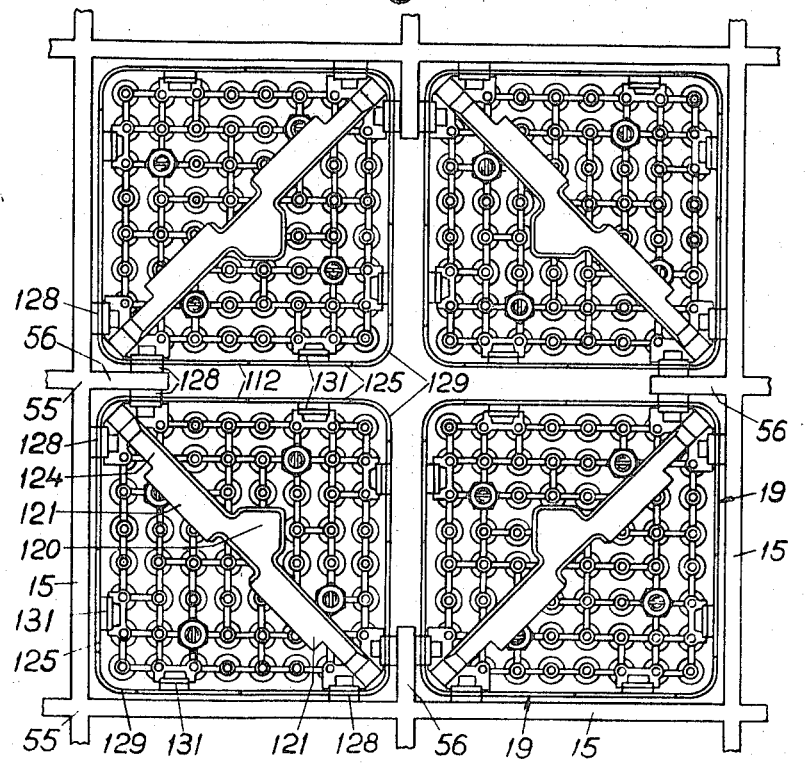
FIG. 9 shows an upper end view of four fuel assemblies according to FIG. 7 with predetermined position in relation to each other and to a core lattice surrounding the upper parts of the assemblies.

The reactor 3 shown schematically in FIG. 1 is a boiling light-water reactor with forced circulation and internal steam-separation. The reactor 3 is surrounded by a primary containment vessel 5 of concrete. The containment vessel 5 is a part of the building construction which also comprises a shaft 6 arranged above the reactors 3, and a fuel pool 7, normally separated from the shaft by gates located at 61.

The core 1 of the reactor 3 is surrounded by a moderator tank 2 to which a core superstructure 4 having steam separators and dryers is usually attached. The core superstructure is prefeably constructed in the manner described in Sodergard application Ser. No. 704,938, filed Feb. 12, 1968. The moderator tank 2 is in turn surrounded by a reactor pressure vessel 8 with a bottom part 9. A plurality of steam-pipes 10 lead from the upper part of the reactor pressure vessel 8. Between the moderator tank 2 and the reactor pressure vessel 8 is a gap from which circulating water is taken out through a plurality of connections 11 to circulation pumps, not shown from where the water is returned through a plurality of connections 12. If desired, circulation pumps inside the reactor may be used, in this case preferably being arranged in the manner described in Leine et al., application Ser. No. 857,686, filed Sept. 15, 1969.

A multitude of parallel vertical tubes pass through the bottom part 9. These tubes comprise leading-in tubes 13 for drives for control rods and leading-in tubes, not shown, for neutron flux measuring probes, similarly not shown. The upper ends of the leading-in tubes or the guide tubes 13 for the control rod drives are situated at the same level and carry control rod guide tubes 17 of equal lengths. The control rod guide tubes are preferably made in accordance with the method described in Sodergard application Ser. No. 723,061, filed Apr. 27, 1968. Each control rod drive comprises an electric motor, a screw and a nut for normal operation of the appropriate control rod, and is provided with a scram function. Preferably a drive in accordance with Swedish Pat. No. 314,749 is used.

Figure 10:
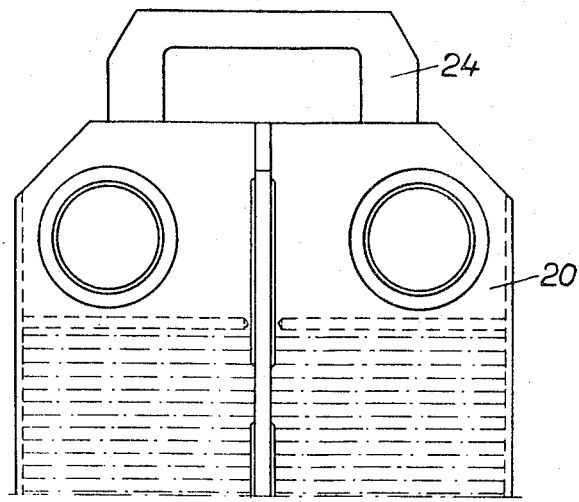
FIG. 10 shows the upper part of a control rod provided with a handle.

The core 1 is built up of vertical units 18, equivalent in number to the number of control rod guide tubes 17. Each unit 18 comprises four fuel assemblies 19 with substantially square cross-section standing in an assembly positioning plate 16 arranged at the upper end of each control rod guide tube 17. The fuel assemblies 19 are guided at their upper ends by a core lattice 15 (FIG. 9). A control rod 20 (FIG. 10) is arranged to operate inside the cruciform gap formed by four assemblies 19, by insertion upwards and withdrawal downwards.

After shutdown for fuel exchange, the reactor 3 is cooled down, for example to below 60° C. and the pressure drops to atmospheric pressure. Opening of the reactor is started by lifting away radiation shielding blocks in the shaft 6 above the reactor 3 and a semi-spherical lid forming the upper part of the containment vessel 5 is released and moved, as well as the radiation shielding blocks, to specially prepared positions in the reactor hall.

The lid of the reactor pressure vessel 8 has only one pipe-connection, that is for the supply of coolant to the lid of the pressure vessel during emergency cooling. This pipe is removed and the bushings in a permanent seal between the flange of the reactor pressure vessel 8 and the containment vessel 5 are sealed.

After a bolt-joint between the reactor vessel 8 and its lid has been loosened, the lid can be lifted by a reactor hall traverse and placed behind the radiation shielding blocks lifted earlier.

The shaft 6 above the reactor pressure vessel 8 is filled with water and the gates (at 61) to the fuel pool 7 are opened. The core super-structure 4 is detached from the moderator tank 2 and moved under water to a position in the water-filled space opposite the fuel basin 7.

The removal and insertion of fuel can then be started. The operations are controlled manually from an operating platform comprising traverse bridge 62 and trolley 63, which can be moved to the desired positions above the reactor core 1 and the fuel pool 7.

On the trolley 63 is a telescope-cylinder means 64 with hoisting machinery. The telescope-cylinder means 64, which can be rotated, is provided at its lower end with a manipulating tool 67 according to the invention for manipulating the fuel assemblies 19. In the embodiment shown the tool 67 is operated pneumatically by means of a compressed air cylinder 74 (see FIG. 11b). Instead of the compressed air cylinder, of course a hydraulic cylinder, an electromagnet or a screw and nut may be used. The hoisting machinery is preferably equipped with a load-sensing means which interrupts the lifting process if the lifting force tends to be too great if a fuel assembly has stuck. Similarly, the lowering process is interrupted if unloading takes place too early if a fuel assembly does not go down as it should.

So that the personnel shall not be unintentionally subjected to too high radiation doses, the lifting process is interrupted automatically if the operator lifts a fuel assembly too high in the water pool.

All functions are controlled from an operating stand on the trolley 63 and the operator can visually supervise the movement of the manipulating tool both through observation apertures in the floor and by means of television equipment.

The fuel assemblies 19 are lifted from the reactors 3 to such a height that they pass freely over the threshold 65 into the transport channel 66 to the fuel pool 7. The trolley 63 is then moved to this space with the fuel assembly 19 hanging in the water underneath. The layer of water above the top of the fuel assembly 19 must be more than 3 meters in order to give sufficient protection from radiation.

The fuel pool 7 is lined with stainless steel and in the pool are positions for exchanging fuel rod bundles in shroud tubes and for inspection of the shroud tubes before new fuel rod bundles are inserted into them. There are also deposit positions for control rods.

When the four fuel assemblies 19 which enclose a control rod 20 have been lifted out of the core 1, the control rods can be exchanged. The manipulating tool 67 is lowered and grips a handle 24 (see FIG. 10) arranged on the control rod 20. After rotating the control rod by means of the telescope-cylinder means 64 and the tool 67 a quarter turn, it is free to be lifted by the handle 24. When a new control rod is lowered the process is reversed. The control rod is preferably manufactured according to the method described in Pat. No. 3,448,008 to Hellman.

In order to make it easier to understand the intended function of the manipulating tool 67, a fuel assembly 19 is first described with reference to FIGS. 2 to 6. In these 101 designates a number of fuel rods containing a ceramic nuclear fuel such as enriched $UO_2$ in the form of sintered pellets 102. These are enclosed in a fuel can 103 sealed at the ends by end plugs 104 and 105 or 106 and 107. The material of the fuel cans and end plugs cay consist of a zirconium alloy such as Zircaloy. In the upper part of each rod is a fission gas space 108 containing a spiral spring 109. The fuel rods are parallel to each other between a top plate 110 and a bottom plate 113 provided with legs 114 and surrounded by a shroud tube 112 having substantially square cross-section. The shroud tube is provided with a bottom transition part 115 fitting into the assembly positioning plate 16. The legs 114 rest on the transition part 115. The top plate 110 and the bottom plate 113 are lattice-like and provided with recesses to receive protuberances arranged on the end plugs 104, 105, 106 and 107 in order to fix the fuel rods at a predetermined distance from each other. Since the fuel assemblies in the reactor are surrounded by water columns of different widths, the enrichment varies so that at least the corner rods in the fuel assemblies have different enrichment from the others, whereby an optimum power equalization over the assembly can be obtained.

In order to prevent the fuel rods, which may have a length exceeding for example 3.5 m. and a thickness of for example 12.5 mm., from being damaged by vibrations caused by the coolant flowing through the fuel assembly, spacers 116 are arranged at several levels (only one level being shown), to keep the fuel rods 101 in their intended positions. Each of these spacers 116 comprises a number of spacer elements 117 arranged in a spacer frame 118. The spacer elements 117 may, for example, have the design shown in Pat. No. 3,405,033 to Widell et al. or, which is even more advantageous, that shown in Pat. No. 3,457,140 to Gladin. The spacer frame 118 is centered in the shroud tube 112 by means of spring members carried by the frame 118, for example leaf springs in the form of spring tongues 119, up to eight in number, and in the case shown there are two springs at each side of the shroud tube.

The combination of several fuel rods with spacers and top and bottom plates, if any, is usually called simply a "bundle" and is designated in the drawings by 111. In the fuel assembly according to the drawings the bundle comprises sixty-four fuel rods, only two of which are supporting. Of course a different number of rods, for example four, may be supporting.

The end plugs 106 and 107 of the supporting rods have thicker and longer protuberances which are threaded at the outer ends and can be locked by means of nuts 122 on the other side of the top or bottom plates, reespectively. It should be ensured that there is a certain clearance for thermal expansion between the nuts 122 and the plates 110 and 113, respectively and between the top plate 110 and the upper parts 123 of the rods 101. The use of a lower number of supporting rods is made possible since their supporting function is used only during manipulation of the bundle 111, for example during insertion of a bundle into the shroud tube. During manipulation of the fuel rod bundle 111 a handle 124 attached to the top plate 110 is used. For manipulation of the fuel assembly the shroud 112 is provided at its upper end with two connection members for the manipulating tool 67 in the form of a pair of diametrically opposed lifting lugs 125 having lifting holes 129, these lifting lugs being extensions of the shroud tube 112. This is best seen in FIG. 6. The lifting lugs 125 are preferably made integral with the shroud tube 112 but it is also possible to weld them on or rivet them. Such riveting is preferably carried out against the outside of the shroud tube which makes it possible to use a different material for the lifting lugs than for the shroud tube.

The bottom part 115 on which, as mentioned before, the fuel rod bundle 111 rests vertically, is attached to the shroud tube 112 by means of rivets 126 or screws 127. The screws 127 may be locked by punch-marks, Heli-Coil® Mid-Grip or the like. When the fuel assembly is being taken out of the core, there is no risk that the rods 101, which are brittle due to irradiation, will be pulled apart with the resultant serious consequences. It is very simple to take apart a fuel assembly in order to re-use the shroud tube 112 and the bottom part 115, since the spacers 116 are not fixed at all in the axial direction, but are held in position by the friction against the rods. If it is feared that the few supporting fuel rods holding the bundle 111 together will not permit it to be drawn out of the shroud tube 112 without breaking, it is possible merely to turn the fuel assembly upside down and shake out the bundle. The elongated, longitudinally running springs 128 arranged at the upper end of the fuel assembly serve to center the fuel assembly in the upper core grid and may be attached to the top plate 110, to its handle 124 or to the shroud tube 112 and in the latter case may be re-used together with the shroud tube. In neither case do they need to be removed when the fuel assembly is taken apart.

When, as is clear from above, the fuel rod bundle 111 stands as a loose insert in the shroud tube 112, wear between the top plate 110 and the shroud tube 112 must be prevented. This is preferably done by means of leaf springs 131 arranged in pairs on the top plate and located so as to engage the lifting lugs 125, see FIGS. 3 and 6.

If the lifting lugs 125 are made in one piece with the shroud tube 112, other parts of the shroud tube 112 extending above the upper end of the fuel rod bundle 111 can be removed so that the top of the shroud tube has substantially the appearance of that shown in FIG. 6. Instead of removing these parts entirely, they may be shaped as springs having various functions as shown in U.S. application Ser. No. 793,812 to Suvanto, filed Jan. 24, 1969.

It is preferable for the shroud tube to be manufactured in one of the ways mentioned in application Ser. No. 734,061 of Brandberg et al. in order to obtain the accuracy of dimensioning which is particularly important in this case. The material of the shroud tube may advantageously be cold-worked Zircaloy, tempered Zr-2.5% Nb or the like. By Zr-2.5% Nb is meant a zirconium alloy containing 2.5% niobium.

Instead of the extensions of the shroud tube 112 being shaped as separate lifting lugs 125, the shroud tube 112 may be extended the same distance around the entire circumference of the cross-section. In this case holes for guide springs 128 must be made in the wall of the shroud tube.

FIGS. 7 to 9 show a fuel assembly 19 which is somewhat modified with respect to that shown in FIGS. 2 to 6. The top plate 110, as previously, is provided with a handle 124 and four guide springs 131 arranged in pairs to guide the fuel rod bundle in the shroud tube 112. As can be seen in FIG. 8, attachment protuberances 130 are arranged on the legs of the handle 124 above the top plate 110, for the guide springs 128 which guide the fuel assembly 19 in the core grid 15. A central blocking protuberance 120 projects from the cross-part of the handle 124 substantially perpendicularly to the longitudinal axis of the fuel assembly 19, and on the other side of the handle 124 two symmetrically positioned blocking protuberances 121 project in a direction substantially opposite to that of the central blocking protuberance 120 (see FIGS. 8 and 9). The blocking protuberances 120 and 121, as will be described in the following, provide a grip in the handle 124 for the manipulating tool 67 only if the handle 124, and thus the fuel assembly 19, is correctly positioned rotationally in relation to the tool 67.

Figure 18:
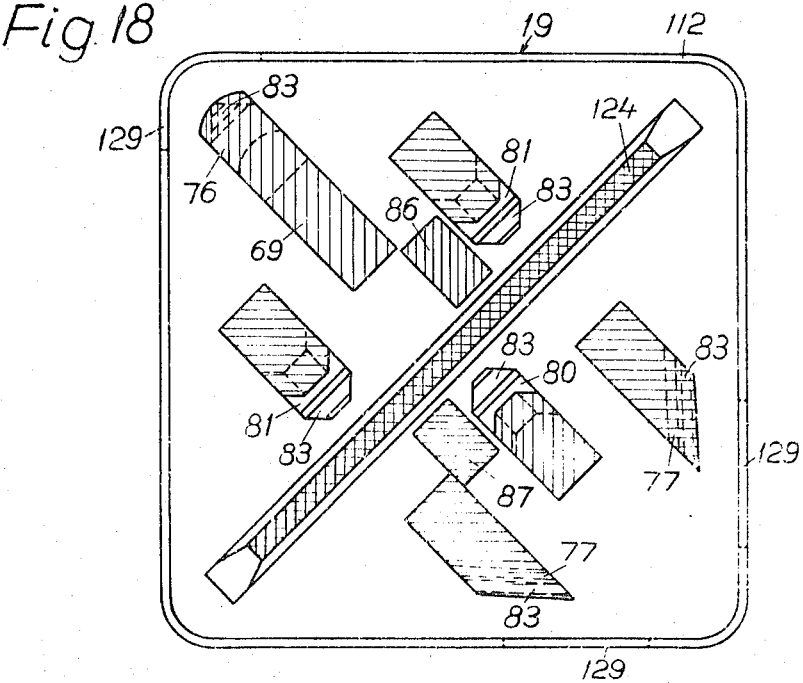
FIG. 18 shows an alternative gripping member-sheathing tube combination to that shown in FIG. 17.

FIG. 18 shows yet another modification of the fuel assembly 19. In this embodiment there are no blocking protuberances on the handle 124. To ensure that the manipulating tool 67 has a correct orientation with respect to the fuel assembly, there are instead three grip holes 129 provided in the shroud tube 112. One grip hole is, as before, in a corner of the shroud tube cross-section and the other grip holes 129 are in the two walls forming the diagonally opposite corner. In order to eliminate absolutely any possibility of incorrect positioning of a fuel rod bundle in relation to the surrounding core, it may in this case be suitable to provide mechanical means to prevent a fuel rod bundle from being inserted in a shroud tube with three lifting holes if the bundle has an incorrect orientation in relation to the shroud tube. The design of such means will be obvious to one skilled in the art in view of the above.

Figure 14:
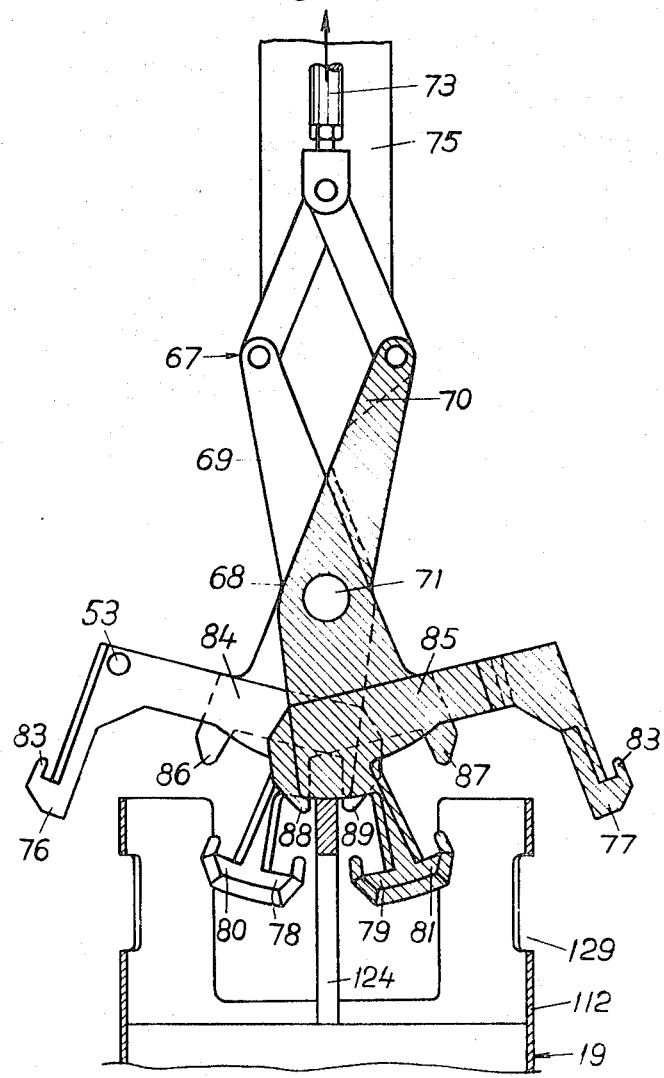
FIG. 14 shows the gripping member with the lower legs in folded-out end position inserted in the upper part of a fuel assembly.
Figure 15:
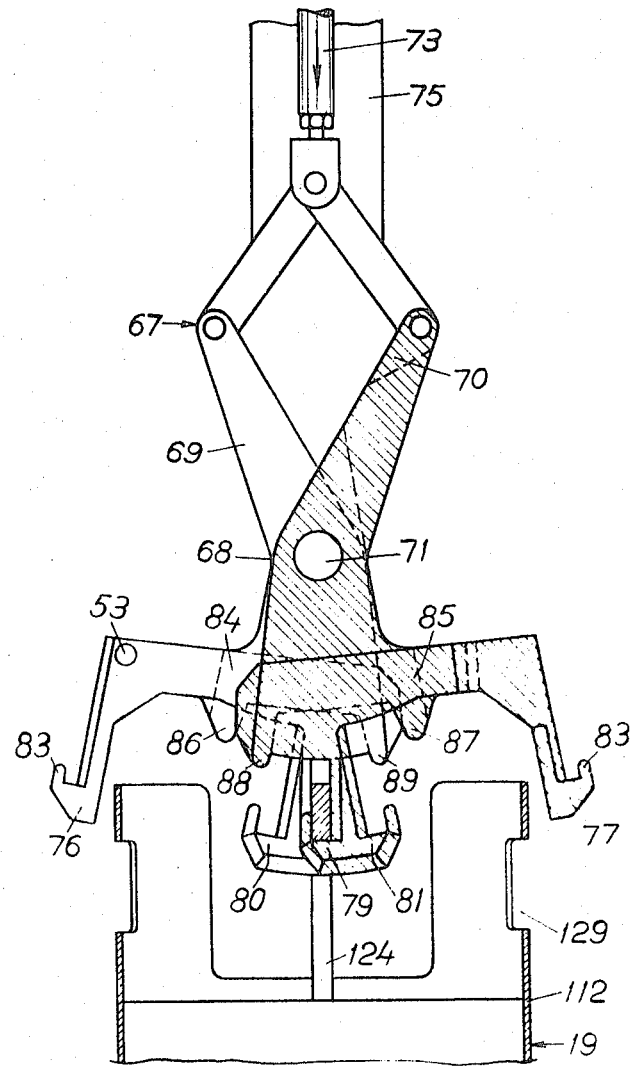
FIG. 15 shows the gripping member when manipulating the fuel rod bundle.
Figure 16:
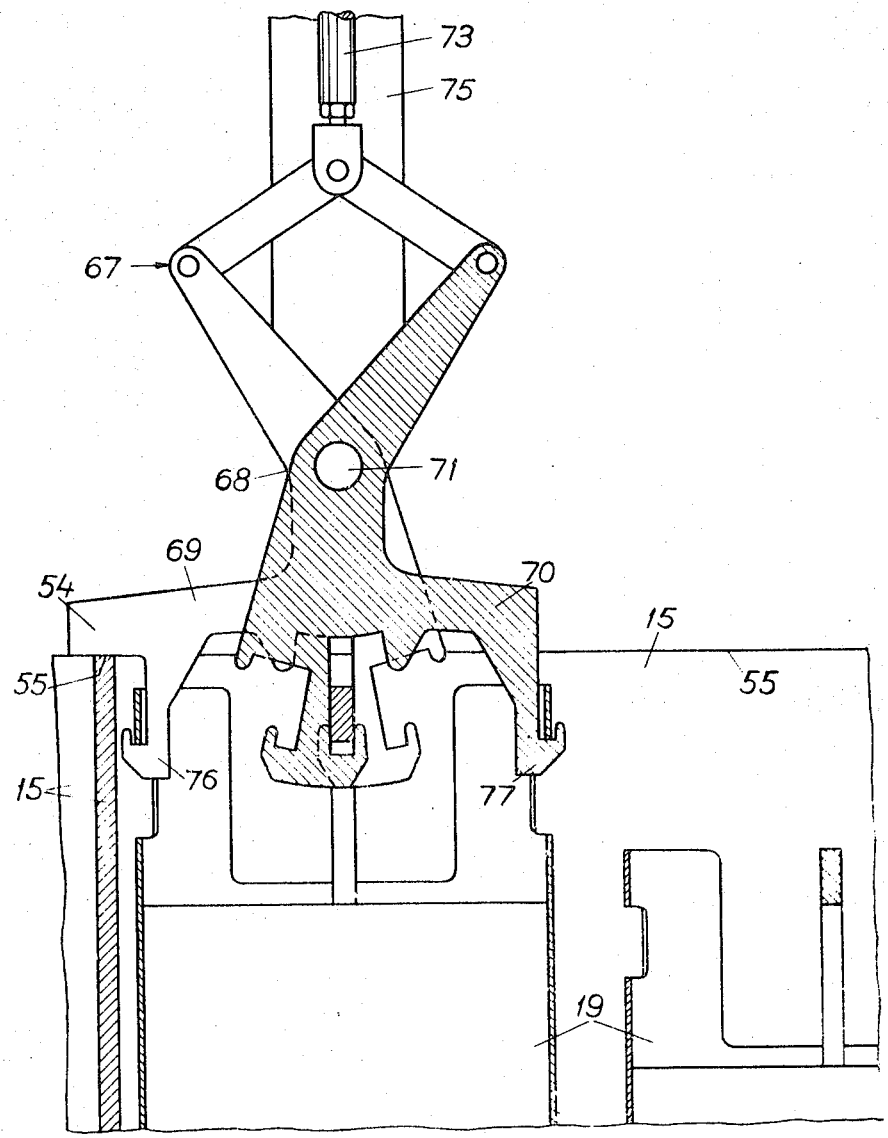
FIG. 16 shows a fuel assembly which is incorrectly rotated during insertion.

FIGS. 11a to 15 and 17 show a preferred embodiment of the manipulating tool 67 and its function and FIGS. 16 and 18 show somewhat modified embodiments. In FIGS. 11a and 13 to 15 the grippable part, that is, the top end, of the fuel assembly 19 is only indicated schematically in order to illustrate the function of the manipulating tool 67. Thus, for example, the blocking protuberances 120 and 121 are not shown in these figures. These are shown, however, in FIG. 17 which is a section along the line XVII—XVII in FIG. 11a.

The manipulating tool 67 comprises a scissor-like gripping member 68 having a single leg 69 and a bifurcated leg 70 which are pivoted on a horizontal shaft 71 in such a way that the single leg 69 can be moved forwards and backwards in a rotary plane between the two parts of the bifurcated leg 70. The upper ends of the legs are pivotally connected by short links 72 of equal length to an operating rod 73 movable by an operating device such as a hydraulic cylinder 74. A rail 75 on each side of the legs in which the shaft 71 is mounted extends downward from the cylinder 74 and keeps the distance between the shaft 71 and the operating device 74 constant.

The legs 69 and 70 are shaped at the lower part with outwardly directed first hook means 76 and 77 for engagement from within outwardly in the lifting holes 129 of the shroud tube 112 and with oppositely directed second hook means 78 and 79, respectively, for engagement from the outside inwardly in the handle 124 of the fuel rod bundle 111 or in the handle 24 of the control rod 20. The legs 69 and 70 are also shaped at their lower ends for simultaneous engagement both with the first hook means 76 and 77 from within outwardly in the lifting holes 129 and with third hook means 80 and 81, respectively, for engagement from the outside inwardly against the handle 124 of the fuel assembly 19.

The single leg 69 thus has the hook means 76, 78 and 80 while the bifurcated leg 70 has the single hook means 77 and the double hook means 79 and 81. The two fork claws of the bifurcated leg 70 are thus joined in the area of the hook means 77 but also by means of a connecting part 82 in the region between the shaft 71 and the connection point for the link 72. While the connecting part 82 may be omitted and the single hook means 77 be shaped as a laterally double hook (see FIG. 18), the bifurcated leg 70 may comprise two separate leg halves—one being a mirror image of the other—arranged one on each side of the single leg 69.

The operating rod 73 which transmits motion from the operating device 74 to the gripping member 68 is shown in a lower end position in FIG. 11a, in which position the gripping member 68 is folded in to the greatest possible extent. All the hook means of both the legs 69 and 70 can now be moved down between the lifting lugs 125 of the fuel assembly as shown in FIG. 11a. As the operating rod 73 is moved upwards the lower parts of the gripping member 68 are gradually folded out. FIG. 13 shows how the third hook means 80 and 81 abut the vertical sides of the handle 124 and the first hook means 76 and 77 grip the fuel assembly 19 in the lifting holes 129. As can be seen, when the fuel assembly 19 is hanging in the manipulating tool, there is normally a certain clearance between the lower side of the handle 124 and the upwardly-facing shoulders of the third hook means 80 and 81. This means that these hook means will only lift the handle 124 if, when the fuel assembly 19 is lifted, the shroud tube 112 should get stuck and be stretched or even break completely while being pulled.

In FIG. 14 the operating rod 73 has assumed an upper end position and the lower part of the gripping member 68 is folded out to the greatest extent. The second hook means 78 and 79, which are oppositely directed in relation to the first and third hook means, are ready in this position to grip the handle 124 of the fuel assembly 19 or, alternatively, the handle 24 of the control rod 20. In this folded out position the first hook means 69 and 70 are outside the shroud tube 112. If the operating rod is moved downwards the second hook means 78 and 79 will be brought into engagement with the sides of the handle 124, as seen in FIG. 15, while at the same time the first hook means 69 and 70 are moved in against the shroud tube 112 with their rear sides first. The alternation of the grip between engagement of the gripping member in the handle 124 only, or in a complete fuel assembly or a shroud tube 112 is characteristic of the manipulating tool 67. If the handle 124 does not have smooth sides, but is provided with blocking protuberances 120 and 121, the gripping member 68 must be rotated half a turn in relation to the handle 124 or vice versa for alternation of grip to take place. Thus the fuel assembly in FIGS. 14 and 15 is turned 180° about its longitudinal axis from the position shown in FIGS. 11a and 13.

Each of the hook means 67, 77, 78, 79, 80 and 81 is provided with a blocking claw 83 which prevents the gripping member 68 from dropping a load during transport. The blocking claws 83 also prevent incorrect operation of the gripping member 68, that is, disengagement of the gripping member 68 before the load has been positioned and the gripping means has been lowered somewhat further so that the blocking claws 83 are free.

Both with the single leg 69 and the bifurcated leg 70, a guide plate 84, 85, respectively, is screwed on. The guide plates 84 and 85 have individual guide means 86, 87, respectively to guide the gripping member 68 in relation to the handle 124 (see FIG. 11a) when releasing the engagement in a complete fuel assembly 19, and also individual guide means 88, 89, respectively to guide the gripping member 68 in relation to the handle 124 (see FIG. 14) or the handle 24 when releasing the engagement of a fuel rod bundle 111 or a control rod 20. The guide means also make it impossible for the blocking claws 83 to catch in the handle and by mistake lift the load again after the gripping member 68 has released the load and is again raised.

In the embodiment shown (FIG. 11b) the operating device 74 consists of a pneumatic cylinder, the piston being rigidly connected with the upper end of the operating rod 73. The piston has an upper end position in which the gripping member 68 is folded out to the greatest extent as shown in FIG. 11a. Thus, although the operating device 74 has only two working positions, the gripping member 68 will have four working positions, as is clear from FIGS. 11a, 13, 14 and 15. Of course the operating member may also comprise a hydraulic cylinder, an electromagnet having a stationary coil and an armature joined to the operating rod 73, or of a motor driven screw, for example, having a movable nut attached to the operating rod 73.

The operating device 74 is rigidly connected to a surrounding tubular housing 90 which is provided at its upper end with an external flange 91 and a covering plate 92. A rod 93 projects centrally from the covering plate 92' and ends in a bar magnet 94. The flange 91 and covering plate 92 are provided at their outer edge with two diametrically opposite grooves 95 running axially. An annular housing 96 surrounding the flange 91 has a lower internal flange 97 and two guides 98. The annular housing 96 is rigidly connected to the lower end of the telescope-cylinder means 64 and the guides 98 and grooves 95 together form a somewhat loose anti-rotation guide for the manipulating tool 67 in relation to the telescope-cylinder means 64. In order to facilitate the slight rotary movement permitted between these members, a thrust bearing 99 is arranged between the flanges 91 and 97. Thus, if the fuel assembly 19 should be lowered into the core in a slightly incorrectly rotated position, the guide springs 128 of the fuel assembly can rotate the assembly to exactly the correct position by guiding it against the cord grid 15.

Between the annular housing 96 and the telescope-cylinder means 64 is a separating wall 50 having a central hole 51. At the edge of the hole are series-connected sensing coils 52. If, when a fuel assembly is lowered into the core, the manipulating tool should be tilted too much, the magnet 94 will deviate so much from its normal central position centrally between the sensing coils 52 that these operate a means to break the current to the hoisting machinery, and the lowering process is interrupted. The sensing coils 52 break the current to the hoisting machinery in the same way when the fuel assembly has reached its bottom position during a normal lowering process, and the manipulating tool 67 and bar magnet 94 are moved upwards in relation to the sensing relays 52. Energization of the sensing coil can also act to prevent the supply of energizing fluid to cylinder 74, to prevent the opening of the gripping members, or the arrangement may be such that the gripping members can be operated only when the full assembly reaches its fully lowered position.

Figure 17:
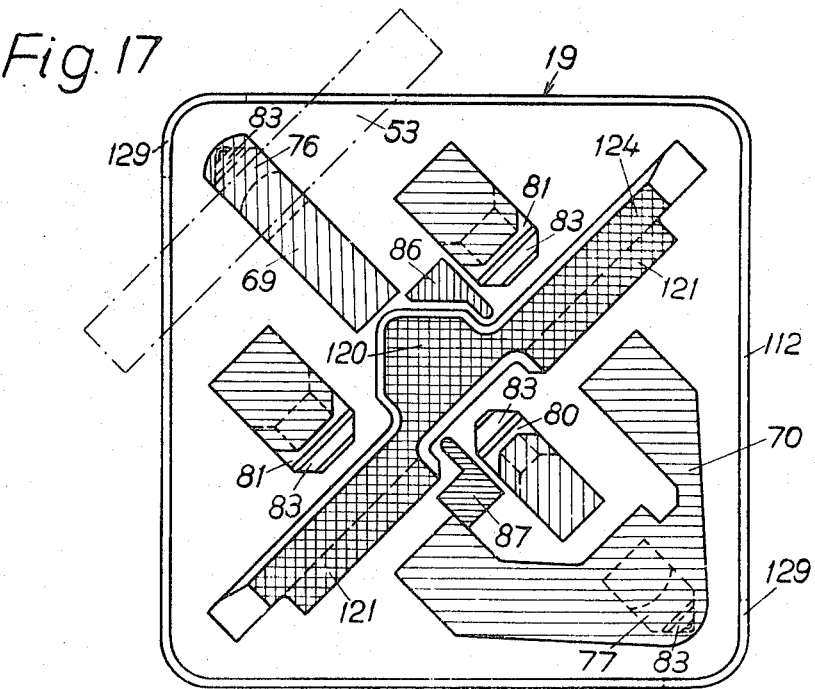

One of the legs of the gripping member 68, preferably the single leg 69, is provided with a stop. FIGS. 11a and 17 shows a stop in the form of a pin 53 arranged perpendicular to the plane of rotation of the legs and FIG. 16 shows a stop in the form of a protuberance 54 projecting in the plane of rotation of the legs.

The stop (53 or 54) and the upwardly facing surface 55 of the core grid 15 form a first part in a blocking arrangement which prevents a fuel assembly from having incorrect orientation after being lowered into the core. The second part of the blocking arrangement, as mentioned above, consists in the fact that the gripping member 68 and the fuel assembly 19 are designed so that the fuel assembly 19 can only be gripped if it and the gripping member 68 have substantiaally correct rotational orientation in relation to each other. In the embodiment according to FIG. 18 this is made possible by providing the gripping member 68 with a hook means 76 and two hook means 77 and by arranging three corresponding lifting holes 129 in the shroud tube 112. The handle 124 may then have smooth sides. However, if the gripping member 68 has one hook means 76 and a single hook means 77 and the shroud tube 112 has two lifting holes 129 (see FIG. 17) corresponding to the hook means, the central blocking protuberances 121 would have to be arranged on the handle 124. When the gripping member 68 and the fuel assembly 19 have a correct orientation with respect to each other, the hook means 80 and 81 can pass the blocking protuberances 120 and 121, as seen in FIG. 17, and engagement can take place. If, however, the gripping means 68 has an incorrect orientation, the blocking protuberances 120 and 121 prevent the hook means 80 and 81 from passing the upper surface of the handle 124. It is thus impossible to grip the fuel assembly 19.

In order to describe more clearly the first part in the blocking arrangement, FIG. 9 is again considered which shows a part of the core grid 15 seen from above. The core grid 15 is constructed of flat bars which are placed horizontally, but on edge, and cross each other at right angles. Each of the core-grid meshes thus formed takes up four fuel assemblies 19, the guide springs 128 of which engage against the vertical sides of the bars and also against vertical partitions 56 projecting from the center of each side of the mesh.

The right-hand part of FIG. 16 shows the difference in level between the upper side 55 of the core grid 15 and the upper part of the fuel assembly 19 when the fuel assembly is in position in the core. The left-hand fuel assembly is lowered with incorrect orientation and the stop 54 thus hits the core grid 15 and the fuel assembly is tilted so that the magnetic breaker, that is the rod magnet 94 and the sensing relays 52, break the current to the hoisting machinery. The gripping member 68 cannot open in this position. A corresponding action also occurs if the stop is shaped as a cross pin 53 instead of as a protuberance 54. This is immediately appreciated if FIG. 17 is imagined on a smaller scale and superimposed on any of the four fuel assembly positions in FIG. 9. As is then clear, only one orientation per position is possible (for example, for the lower right fuel assembly of FIG. 9), namely that shown, since in any other orientation the pin 53 will engage the frame 15 and/or the inward projections 56. In the three other cases the pin 53 will hit the core grid so that the fuel assembly will remain suspended, lowering is interrupted and the gripping member 68 cannot be opened. The fuel assembly 19 must then be hoisted up and rotated to the correct position, after which the manipulating tool can be lowered again and leave the fuel assembly in the intended place with the intended orientation in the core.

Besides the operation, the stop also has another task to fulfill. When, during manipulating empty shroud tubes, that is fuel assemblies from which the fuel rod bundle has been withdrawn, the shroud tube is lowered so that it rests in a deposit position, there is no handle 124 which through the gripping member 68 moves the rod magnet 94 in relation to the sensing coils 52 so that the lowering process is interrupted. This function is then taken over by the stop 53 or 54 which hits the upper edge of a lifting lug 125 and causes the magnetic breaker to break the current to the hoisting machinery.

We claim:

1. Manipulating tool for a nuclear fuel assembly of the type having a fuel rod bundle provided with a handle and arranged as a freely removable loose insert in a shroud tube provided at its upper end with at least one lifting hole on each side of the handle and for other nuclear reactor components provided with handles, said manipulating tool comprising a scissor-like gripping member having crossing legs pivoted together, an operating device connected to the upper ends of the legs, the lower parts of the legs having outwardly projecting first hook means for gripping from the inside outwardly in the lifting holes and with oppositely directed second hook means for gripping in the handle from the outside inwardly, the lower part of the legs having third hook means for engagement with the handle from the outside inwardly simultaneously with the engagement of the first hook means from within outwardly in the lifting holes.

2. Manipulating tool for a nuclear fuel assembly of the type having a fuel rod bundle provided with a handle and arranged as a freely removable loose insert in a shroud tube provided at its upper end with at least one lifting hole on each side of the handle and for other nuclear reactor components provided with handles, said manipulating tool comprising a scissor-like gripping member having crossing legs pivoted together, an operating device connected to the upper ends of the legs, said tool including a lifting device, said gripping member with its operating member being connected to the lifting device, and an axial bearing in the connection between the gripping member and the lifting device.

3. Manipulating tool for a nuclear fuel assembly of the type having a fuel rod bundle provided with a handle and arranged as a freely removable loose insert in a shroud tube provided at its upper end with at least one lifting hole on each side of the handle and for other nuclear reactor components provided with handles, said manipulating tool comprising a scissor-like gripping member having crossing legs pivoted together, an operating device connected to the upper ends of the legs, said tool including a lifting device, said gripping member with its operating member being connected to the lifting device and a monitoring means responsive to misorientation between the gripping member and the lifting device for interrupting the manipulating process.

References Cited
UNITED STATES PATENTS

| | | | |
|---|---|---|---|
| 3,029,100 | 4/1962 | Laine | 294—106 |
| 3,252,559 | 5/1966 | Von Gal | 198—20 |

JOSEPH WEGBREIT, Primary Examiner

J. D. CHERRY, Assistant Examiner

U.S. Cl. X.R.

294—106, 118